US012723563B2

(12) United States Patent
Signorelli et al.

(10) Patent No.: US 12,723,563 B2
(45) Date of Patent: Sep. 1, 2026

(54) ELECTROMAGNETIC FUEL INJECTOR

(71) Applicant: MARELLI EUROPE S.P.A., Corbetta (IT)

(72) Inventors: Giorgio Signorelli, Corbetta (IT); Michele Petrone, Corbetta (IT); Stefano Petrecchia, Corbetta (IT); Martina La Malfa, Corbetta (IT); Massimo Mattioli, Corbetta (IT); Francesco Zampolli, Corbetta (IT); Nicola Mundo, Corbetta (IT); Luca Mancini, Corbetta (IT)

(73) Assignee: MARELLI EUROPE S.P.A., Corbetta (IT)

( * ) Notice: Subject to any disclaimer, the term of this patent is extended or adjusted under 35 U.S.C. 154(b) by 168 days.

(21) Appl. No.: 18/767,217

(22) Filed: Jul. 9, 2024

(65) Prior Publication Data

US 2025/0020097 A1 Jan. 16, 2025

(30) Foreign Application Priority Data

Jul. 10, 2023 (IT) ........................ 102023000014409
Mar. 6, 2024 (IT) ........................ 102024000004939

(51) Int. Cl.
*F02M 51/06* (2006.01)
*F02M 61/04* (2006.01)
*F02M 61/20* (2006.01)

(52) U.S. Cl.
CPC ........ *F02M 51/0625* (2013.01); *F02M 61/04* (2013.01); *F02M 61/20* (2013.01)

(58) Field of Classification Search
CPC .... F02M 51/0625; F02M 61/04; F02M 61/20; F02M 51/0617; F02M 51/0614; F02M 61/161; H01F 2007/1692; F16K 31/0679
See application file for complete search history.

(56) References Cited

U.S. PATENT DOCUMENTS 2,901,210 A * 8/1959 Hebard ............... E21B 43/1235 251/129.1
4,972,996 A * 11/1990 Cerny .................. F02M 61/161 239/585.4

(Continued)

FOREIGN PATENT DOCUMENTS

DE 2237746 * 2/1974 ......... F02M 51/0617
DE 102015212666 A1 1/2017

(Continued)

OTHER PUBLICATIONS

Search Report for Italian Patent Application No. 202300014409 dated Jan. 3, 2024.

(Continued)

*Primary Examiner* — Christopher R Dandridge
(74) *Attorney, Agent, or Firm* — Howard & Howard Attorneys PLLC

(57) ABSTRACT

An electromagnetic fuel injector having: a tubular support body; an injection nozzle arranged at one end of the support body; an injection valve coupled to the injection nozzle; a plunger, which is movable, so as to adjust the fuel flow through the injection nozzle, between a closed position and an open position of the injection valve; an electromagnetic actuator provided with at least one main electromagnet and at least one secondary electromagnet; and a closing spring configured to push the plunger towards the closed position of the injection valve. The secondary electromagnet has a secondary coil and a secondary movable armature, which is arranged inside the support body, is movable, is integral to the plunger and is magnetically coupled to the secondary coil but lacks a secondary fixed armature, which is integral to the support body, is arranged inside the support body and is magnetically coupled to the secondary movable armature (Continued)

so as to magnetically attract the secondary movable armature.

16 Claims, 4 Drawing Sheets

(56) References Cited

U.S. PATENT DOCUMENTS

| | | | | |
|---|---|---|---|---|
| 6,373,363 | B1 * | 4/2002 | Spakowski | H01F 7/1607 335/251 |
| 6,796,511 | B2 * | 9/2004 | Hohl | F02M 61/205 251/129.09 |
| 2019/0360424 | A1 * | 11/2019 | Parotto | F02D 41/20 |

FOREIGN PATENT DOCUMENTS

| | | | | | |
|---|---|---|---|---|---|
| EP | 1619384 | A2 | | 1/2006 | |
| EP | 1650428 | A2 | | 4/2006 | |
| EP | 2792877 | A1 | | 10/2014 | |
| EP | 2975256 | A1 | | 1/2016 | |
| EP | 3091218 | A1 | | 11/2016 | |
| EP | 3091219 | A1 | | 11/2016 | |
| FR | 3017685 | A1 | * | 8/2015 | H01F 7/1638 |

OTHER PUBLICATIONS

Search Report for Italian Patent Application No. 202400004939 dated Sep. 18, 2024.

* cited by examiner

ELECTROMAGNETIC FUEL INJECTOR

CROSS-REFERENCE TO RELATED APPLICATIONS

This patent application claims priority from Italian patent applications no. 102023000014409 filed on Jul. 10, 2023, and no. 102024000004939 filed on Mar. 6, 2024, the entire disclosure of which is incorporated herein by reference.

TECHNICAL FIELD

The present invention relates to an electromagnetic fuel injector.

The present invention finds advantageous application in an electromagnetic hydrogen injector, to which the following specification will make explicit reference without thereby losing generality.

PRIOR ART

Generally, an electromagnetic fuel injector (for example as described in patent application EP1619384A2) comprises a cylindrical tubular support body equipped with a central supply channel, which serves as a fuel duct and ends with an injection nozzle regulated by an injection valve controlled by an electromagnetic actuator. The injection valve is provided with a plunger, which is moved by the action of the electromagnetic actuator between a closed position and an open position of the injection nozzle against the action of a closing spring which pushes the plunger toward the closed position. The plunger ends with a shutter head designed to rest tightly against a valve seat of the injection valve.

The electromagnetic actuator comprises a (at least one) coil arranged externally and in a fixed position around the support body, a movable armature made of ferromagnetic material, which is rigidly connected to the plunger and is movably mounted within the support body, and a fixed armature (or bottom member) made of ferromagnetic material, which is arranged inside the support body in the area of the coil and is designed to magnetically attract the movable armature when the coil is energized.

When a liquid fuel is injected, the presence of the liquid fuel within the support body constitutes a significant obstacle to the movement of the movable armature, effectively creating a hydraulic damper which limits the moving speed of the movable armature; furthermore, a liquid fuel (as opposed to a gaseous fuel) has a lubricating effect reducing the wear of the various components which in use come into contact with each other and limits the noise produced by the various components which in use come into contact with each other. Instead, when a gaseous fuel is injected (and especially when hydrogen, which is an extremely light gas, is injected) the presence of the gaseous fuel inside the support body does not constitute a significant obstacle to the movement of the movable armature and therefore the movable armature moves at high speeds and impacts violently against the fixed armature at the end of the opening movement. This violent impact of the movable armature against the fixed armature at the end of the opening movement causes both high noise and accelerated degradation (wear); moreover, the violent impact of the movable armature against the fixed armature at the end of the opening movement also causes a significant rebound phenomenon which introduces a certain amount of randomness in the amount of fuel being injected.

In this respect it is important to note that hydrogen has a low density (since it has a very simple molecule composed of only two hydrogen atoms) and therefore, in order to inject a sufficient amount (mass) of hydrogen into a combustion chamber, a corresponding large volume of hydrogen must be injected, which, among other things, requires a large passage area for hydrogen to pass through the injection valve (i.e., the opening through which hydrogen must pass to exit the hydrogen injector must be large). In order to have a large passage area for hydrogen to pass through the injection valve, the plunger (therefore the movable armature) needs to have a long stroke between the closed position and the open position, which further increases the speed of impact of the movable armature against the fixed armature at the end of the opening movement.

To limit the speed of impact of the movable armature against the fixed armature at the end of the opening movement, particular profiles of the current passing through the coil of the electromagnetic actuator are currently used and should allow the magnetic force attracting the movable armature toward the fixed armature to be reduced when the movable armature is close to the fixed armature; however, controlling the magnetic force attracting the movable armature toward the fixed armature when the movable armature is close to the fixed armature is extremely complex and relatively inaccurate because in this position the magnetic force attracting the movable armature toward the fixed armature is highly non-linear (that is, it increases exponentially when the air gap between the movable armature and the fixed armature becomes very small).

Patent applications EP3091219A1 and EP2975256A1 describe an electromagnetic fuel injector, wherein the electromagnetic actuator comprises two separate and independent electromagnets, each comprising a coil, a movable armature made of ferromagnetic material and magnetically coupled to the coil, and a fixed armature (or bottom member) made of ferromagnetic material and magnetically coupled to the coil and the movable armature; i.e., both electromagnets are provided with respective movable armatures integral with the plunger.

DESCRIPTION OF THE INVENTION

The object of the present invention is to provide an electromagnetic fuel injector, which is s free from the drawbacks described above, i.e., which has low noise and modest degradation (wear), and at the same time is easy and inexpensive to manufacture.

According to the present invention, an electromagnetic fuel injector is provided as claimed in the appended claims.

The claims illustrate a preferred embodiment of the present invention which forms an integral part of this description.

BRIEF DESCRIPTION OF THE DRAWINGS

The present invention will now be described with reference to the accompanying drawings, which illustrate a non-limiting embodiment thereof, wherein.

PREFERRED EMBODIMENTS OF THE INVENTION

Figure 1:
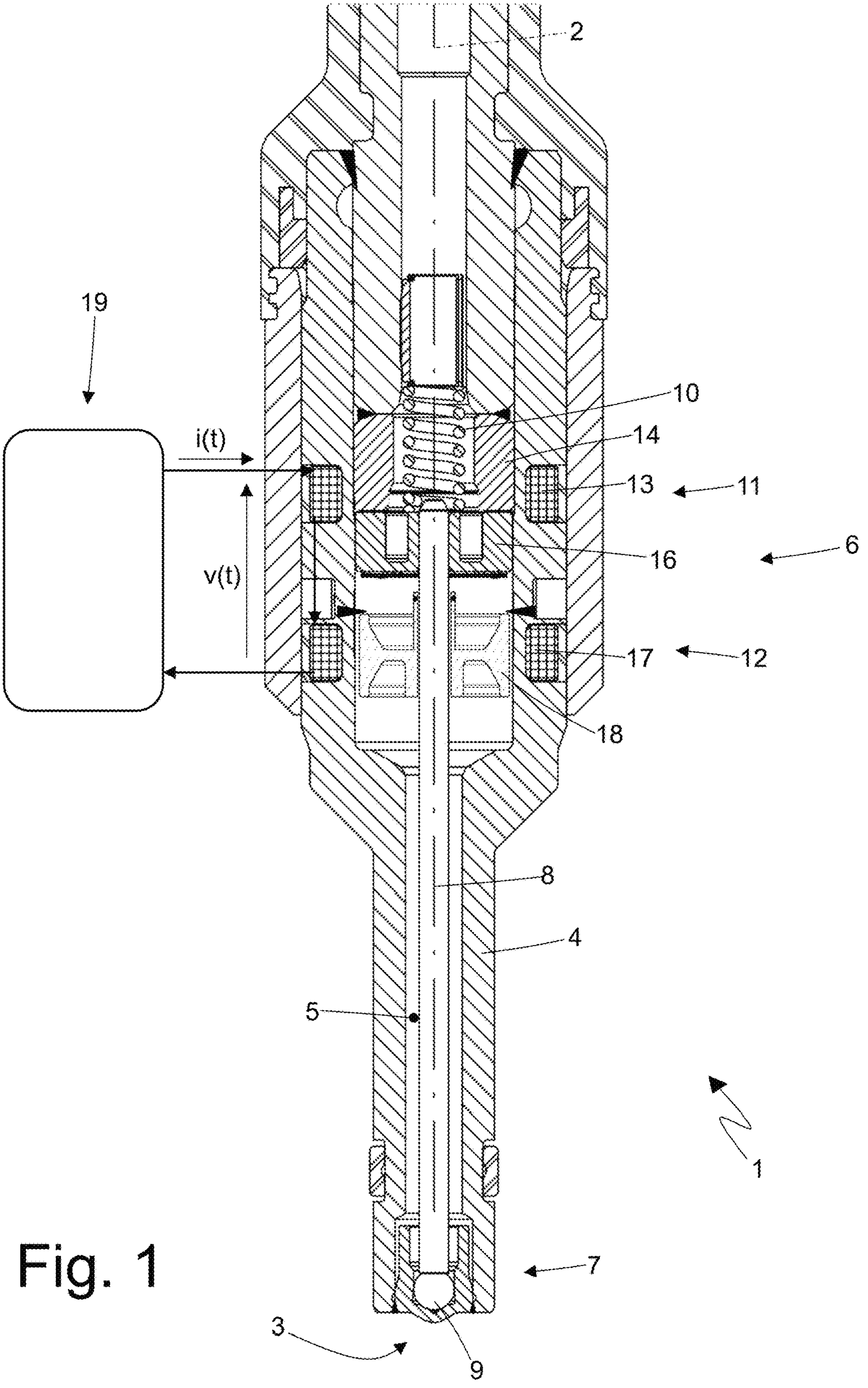
FIG. 1 is a longitudinal section of part of a fuel injector made in accordance with the present invention.

In FIG. 1, reference number 1 indicates, as a whole, an electromagnetic injector of gaseous fuel (in particular hydrogen), which has a cylindrical symmetry around a longitudinal axis 2 and can be controlled to inject hydrogen through an injection nozzle 3, which ends directly into a combustion chamber of an internal combustion engine cylinder (not shown).

The electromagnetic injector 1 comprises a support body 4, which has a tubular cylindrical shape with a variable cross-section along the longitudinal axis 2 and a supply channel 5 extending throughout the length of the support body 4 to supply pressurized hydrogen to the injection nozzle 3.

The support body 4 houses an electromagnetic actuator 6 and an injection valve 7; in use, the injection valve 7 is actuated by the electromagnetic actuator 6 to regulate the flow of hydrogen through the injection nozzle 3, which is obtained in the area of the injection valve 7.

The electromagnetic actuator 6 is configured to axially move (i.e., along the longitudinal axis 2) a movable unit provided with a plunger 8 ending with a shutter 9. The shutter 9 cooperates with a valve seat of the injection valve 7 to regulate the flow of hydrogen through the injection nozzle 3. In other words, the support body 4 ends with a (at least one) through hole in which the valve seat is defined and which is engaged by the shutter 9. In particular, the electromagnetic actuator 6 is configured to move the shutter 9 between a closed position and an open position of the injection valve 7. In addition, the electromagnetic actuator 6 is coupled to a closing spring 10 which keeps the electromagnetic injector 1 normally closed, i.e., pushing the shutter 9 toward the closed position of the injection valve 7. In other words, normally the injection valve 7 is closed due to the effect of the closing spring 10 which pushes the plunger 8 into the closed position, in which the shutter 9 of the plunger 8 presses against the valve seat of the injection valve 7.

In the embodiment shown in the attached figures, the injection valve 7 opens axially inwards, and preferably the shutter 9 has a spherical shape; according to a different embodiment, not shown, the injection valve 7 opens axially outwards, and in this embodiment the shutter 9 may, for example, have a frustoconical shape.

Figure 2:
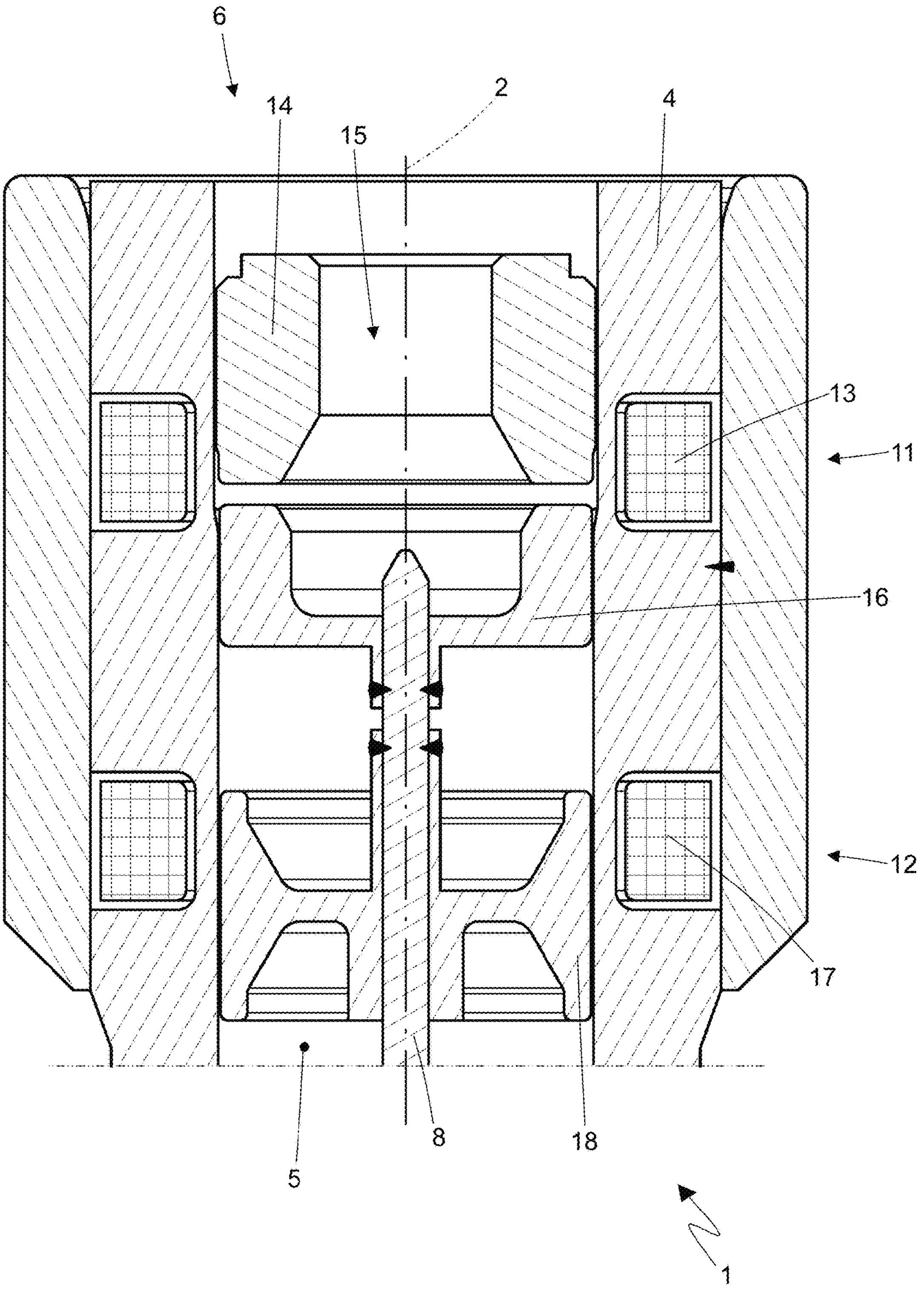
FIG. 2 is a view in enlarged scale of a detail of FIG. 1.

As better shown in FIG. 2, the electromagnetic actuator 6 comprises a main (master) electromagnet 11 and a secondary (slave) electromagnet 12, which are controlled together (i.e., with the same current control): the main electromagnet 11 is configured (when it is activated) to apply a force to the plunger 8 which opens the injection valve 7 (thus, contrary to the elastic force generated by the closing spring 10), and similarly the secondary electromagnet 12 is also configured (when it is activated) to apply a force to the plunger 8 which opens the injection valve 7 (thus, contrary to the elastic force generated by the closing spring 10). In other words, the two electromagnets 11 and 12 are configured to apply mutually concordant forces to the plunger 8, pushing the plunger 8 toward the open position of the injection valve 7.

The main electromagnet 11 comprises a main coil 13 housed externally to the support body 4, and a main fixed armature 14 (pole or bottom member or pole piece) made of ferromagnetic material, which is housed inside the support body 4 in a fixed position in the area of the main coil 13 and has a (at least one) central hole 15 to allow fuel to flow toward the injection nozzle 3 (alternatively, the hole 15 may not be arranged in a central position); that is, the main fixed armature 14 is inserted inside the support body 4 and integral with the support body 4 (generally, it is welded to the support body 4). In addition, the main electromagnet 11 comprises a main movable armature 16, which is arranged inside the support body 4, is integral with the plunger 8 (i.e., it is part of the movable unit) and therefore is axially movable, is arranged near the main fixed armature 14, i.e., it is magnetically coupled to the main fixed armature 14 (therefore facing it to be close to it), and (when the coil 13 is energized) is magnetically attracted by the main fixed armature 14; that is, the main movable armature 16 is magnetically coupled to the main coil 13 as it is passed through by the magnetic flux generated by the main coil 13. In other words, the main electromagnet 11 is configured to generate a magnetic force pushing the plunger 8 (integral with the main movable armature 16) toward the open position essentially due to the magnetic attraction that is generated between the main movable armature 16 and the main fixed armature 14.

The secondary electromagnet 12 comprises a secondary coil 17 housed externally to the support body 4 but does not comprise any secondary fixed armature (pole or bottom member or pole piece) made of ferromagnetic material, which would be housed inside the support body 4 in a fixed position in the area of the secondary coil 16. In addition, the secondary electromagnet 12 comprises a secondary movable armature 18 which is integral with the plunger 8 (i.e., it is part of the movable unit) and therefore is axially movable, is arranged in the area of the secondary coil 17 and is magnetically attracted (when the secondary coil 17 is energized) toward a position of minimum magnetic reluctance relative to the secondary coil 17; that is, the secondary movable armature 18 is magnetically coupled to the secondary coil 17 as it is passed through by the magnetic flux generated by the secondary coil 17. In other words, the secondary electromagnet 12 is configured to generate a magnetic force pushing the plunger 8 (integral with the main movable armature 16) toward the open position essentially due to the forces attracting the secondary movable armature 18 toward a position of minimum magnetic reluctance relative to the secondary coil 17.

In summary, the secondary electromagnet 12 lacks its own secondary fixed armature magnetically coupled to the secondary movable armature 18 (therefore facing it to be close to it).

According to a preferred embodiment, the secondary movable armature 18 is configured (i.e., shaped and positioned) so that, throughout the stroke made by the secondary movable armature 18 (which is integral with the plunger 8 and part of the movable unit) between the closed position and the open position of the injection valve 7, the secondary electromagnet 12 always exclusively generates a force pushing the plunger 8 toward the open position of the injection valve 7; in other words, in this embodiment, the magnetic force generated by the secondary electromagnet 12 has the same direction throughout the stroke made by the secondary movable armature 18 between the closed position and the open position of the injection valve 7.

According to a different embodiment, the secondary movable armature 18 is configured (i.e., shaped and positioned) so that along an initial part of the stroke made by the secondary movable armature 18 (which is integral with the plunger 8 and part of the movable unit) between the closed position and the open position of the injection valve 7, the secondary electromagnet 12 generates a force pushing the plunger 8 toward the open position of the injection valve 7, whereas along a final part of the stroke made by the secondary movable armature 18 (which is integral with the plunger 8 and part of the movable unit) between the closed position and the open position of the injection valve 7, the secondary electromagnet 12 generates a force pushing the plunger 8 toward the closed position of the injection valve 7; in other words, in this embodiment, the magnetic force generated by the secondary electromagnet 12 reverses its direction along the stroke made by the secondary movable armature 18 between the closed position and the open position of the injection valve 7: initially (when the secondary movable armature 18 is close to the closed position) the magnetic force generated by the secondary electromagnet 12 pushes toward the open position, whereas at the end (when the secondary movable armature 18 is close to the open position) the magnetic force generated by the secondary electromagnet 12 pushes toward the closed position. However, this embodiment (in which the magnetic force generated by the secondary electromagnet 12 reverses along the stroke of the plunger 8 from the closed position to the open position) is generally avoided as it makes controlling the position of the plunger 8 unstable and therefore very difficult to perform accurately.

According to a further embodiment, the secondary movable armature 18 is configured (i.e., shaped and positioned) so that, throughout the stroke made by the secondary movable armature 18 (which is integral with the plunger 8 and part of the movable unit) between the closed position and the open position of the injection valve 7, the secondary electromagnet 12 always exclusively generates a force pushing the plunger 8 toward the closed position of the injection valve 7, and therefore always adds to the closing force generated by the spring 10 and opposes the force generated by the main electromagnet 11; in other words, in this embodiment, the magnetic force generated by the secondary electromagnet 12 has the same direction throughout the stroke made by the secondary movable armature 18 between the closed position and the open position of the injection valve 7, which direction is concordant with the closing force generated by the spring 10 and discordant with the magnetic force generated by the main electromagnet 11. Preferably, in this embodiment, the magnetic force generated by the secondary electromagnet 12 is zero when the injection valve 8 (i.e., the plunger 8) is in the closed position and increases (starting from zero) when the injection valve 8 (i.e., the plunger 8) moves from the closed position to the open position.

The electromagnetic injector 1 comprises (is connected to) a control unit 19 (shown schematically in FIG. 1) which electrically powers both the two coils 13 and 17 of the two electromagnets 11 and 12 by applying to the series of the two coils 13 and 17 an electric voltage v(t) which generates the circulation of an electrical current i(t). In particular, the two coils 13 and 17 of the two electromagnets 11 and 12 are connected to one another in series and, hence, the same electric current flows through them. In other words, the electromagnets 11 and 12 are controlled by the same electric current.

In use, when the electromagnets 11 and 12 are de-energized, the main movable armature 16 is not subject to any force of magnetic origin and therefore is solely subject to the elastic force generated by the closing spring 10 which pushes the main movable armature 16 together with the plunger 8 toward the closed position (i.e., downwards), and in this situation the injection valve 7 is closed; the "end stop" of the closed position is established by the contact of the shutter 9 against the valve seat of the injection valve 7 (or, more generally, by the contact of an element of the movable unit against a fixed element integral with the support body 4, i.e., the "end stop" of the closed position can be established independently of the contact of the shutter 9 against the valve seat of the injection valve 7).

In use, to open the injection valve 7, both the electromagnets 11 and 12 are activated (i.e., both the coils 13 and 17 are energized) so that both the electromagnets 11 and 12 generate magnetic forces pushing the plunger 8 (i.e., the two movable armatures 16 and 18) toward the open position, overcoming the elastic force of the closing spring 10; as a result, the plunger 8 (i.e., the two movable armatures 16 and 18) moves toward the open position, causing the injection valve 7 to gradually open. The (fully) open position of the injection valve 7 is reached when the main movable armature 16 comes to rest against the main fixed armature 14, as the "end stop" of the open position is established by the contact of the main movable armature 16 against the main fixed armature 14 (or, more generally, by the contact of an element of the movable unit against a fixed element integral with the support body 4). That is, at the end of the opening step, the main movable armature 16 ends its stroke against the main fixed armature 14.

Generally, once the main movable armature 16 has come into contact with the main fixed armature 14, to keep the injection valve 7 open, a lower intensity electrical current i(t) is supplied to the coils 13 and 17 of the electromagnets 11 and 12, as a reduced magnetic force is sufficient to maintain the opening position.

In use, to close the injection valve 7, the electromagnets 11 and 12 are switched off so that the plunger 8, no longer subject to any force of magnetic origin, is pushed by the elastic force generated by the closing spring 10 toward the closed position (i.e., downwards).

According to a possible embodiment, the electromagnets 11 and 12 remain switched off throughout the closing step.

According to an alternative embodiment, when (at the end of the closing step) the shutter 9 is close to the valve seat of the injection valve 7, the electromagnets 11 and 12 are briefly activated (reactivated) (i.e., the coils 13 and 17 are energized) so that the electromagnets 11 and 12 generate a magnetic force pushing the plunger 8 toward the open position, thereby slowing down the movement of the plunger 8 toward the closed position. It is important to note that the magnetic force generated at the end of the closing step by the electromagnets 11 and 12 is not able to (i.e., it is not strong enough to) stop or reverse the movement of the plunger 8 toward the closed position and has only the effect of slowing down (braking) the movement of the plunger 8 toward the closed position. Therefore, at the end of the closing step, the main movable armature 16 ends its stroke when the shutter 9 impacts the valve seat of the injection valve 7 (the "end stop" of the closed position is established by the contact of the shutter 9 against the valve seat of the injection valve 7) against which it impacts at a relatively low speed as a result of the slowing down (braking) action exerted by the electromagnets 11 and 12.

According to a preferred embodiment, the electromagnets 11 and 12 are deactivated before the plunger 8 reaches the closed position also to account for electrical, magnetic and mechanical inertia (i.e., the magnetic force generated by the electromagnets 11 and 12 does not zero immediately when the electromagnets 11 and 12 are deactivated).

Figure 3:
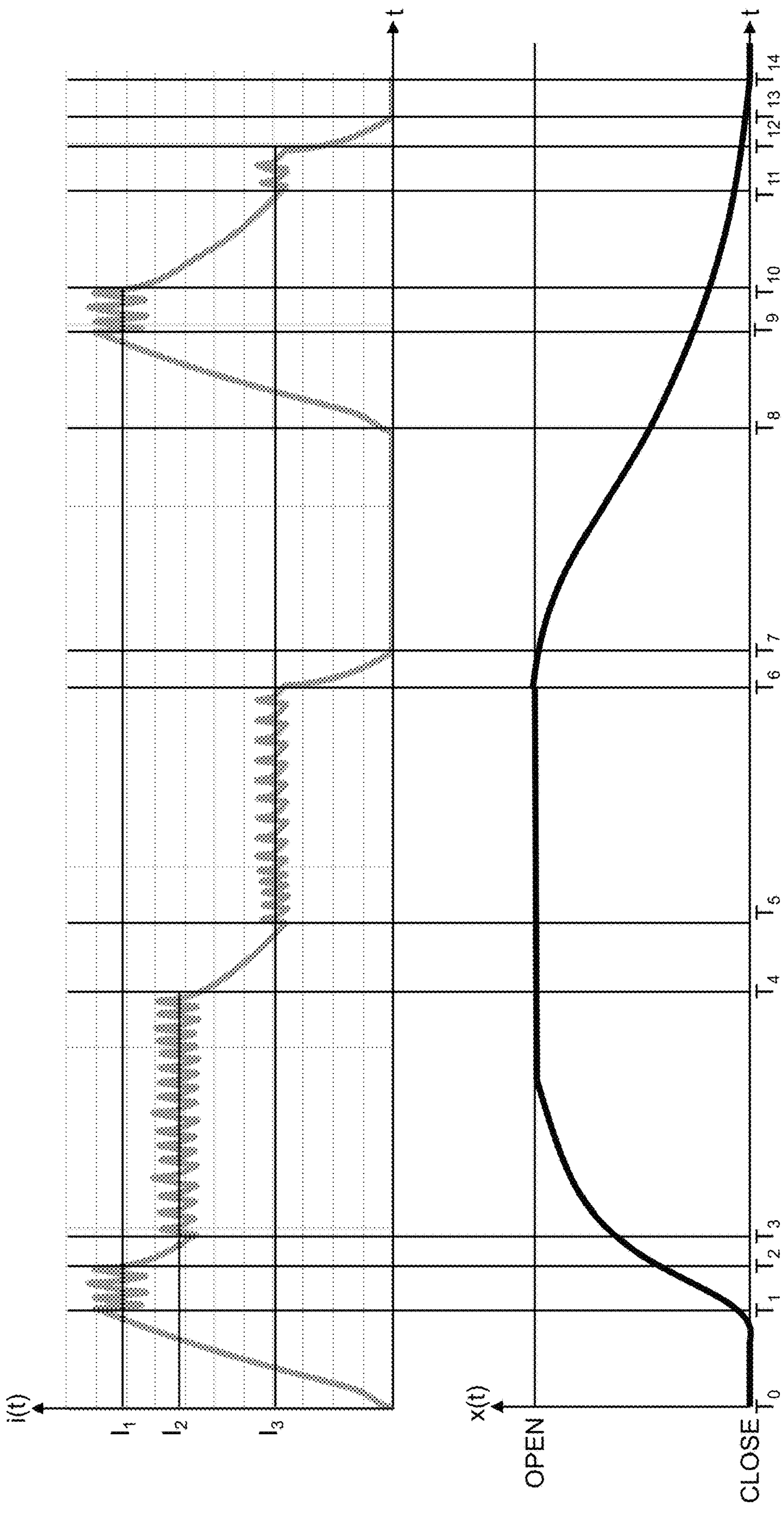
FIG. 3 illustrates a time course of an electrical current passing through an electromagnetic actuator of the fuel injector in FIG. 1 and a time course of a position of a movable plunger of the fuel injector in FIG. 1.

FIG. 3 shows an example of an opening and closing cycle of the fuel injector 1 starting from the closed position: at the instant $T_0$, a positive electrical voltage v(t) is applied to circulate through the electromagnets 11 and 12 an electrical current i(t) that rapidly increases from the zero value to a peak effective value $I_1$ that is reached from the instant $T_1$ and is maintained until the instant $T_2$ by cycling the electrical voltage v(t) applied to the electromagnets 11 and 12 between a positive value and a zero value, so that the electrical current i(t) is maintained within a range centred on the peak effective value $I_1$.

At the instant $T_2$, the electrical current i(t) through the electromagnets 11 and 12 is decreased until, at the instant $T_3$, a holding effective value $I_2$ is reached (i.e., a value less than the peak effective value $I_1$) by applying to the electromagnets 11 and 12 a zero or negative electrical voltage v(t); the holding effective value $I_2$ is maintained up to the instant $T_4$ by cycling the electrical voltage v(t) applied to the electromagnets 11 and 12.

At the instant $T_4$, the electrical current i(t) through the electromagnets 11 and 12 is decreased until, at the instant $T_5$, a holding effective value $I_3$ is reached (i.e., a value less than the holding effective value $I_2$) by applying to the electromagnets 11 and 12 a zero or negative electrical voltage v(t); the holding effective value $I_3$ is maintained up to the instant $T_6$ by cycling the electrical voltage v(t) applied to the electromagnets 11 and 12.

The electrical current i(t) circulating through the electromagnets 11 and 12 generates a magnetic force attracting the plunger 8 toward the open position, overcoming the elastic force generated by the spring 10; then, between the instant $T_0$ and the instant $T_4$, the plunger 8 moves from the closed position to the open position. After the plunger 8 has started to move, a lower force is sufficient to continue the travel of the plunger 8 and especially to keep the plunger 8 in the open position, and therefore the electrical current i(t) can be decreased from the initial peak effective value $I_1$ to the holding effective values $I_2$ and $I_3$.

At the instant $T_6$, the electrical current i(t) is gradually zeroed by applying to the electromagnets 11 and 12 a zero or negative electrical voltage v(t); in particular, the zero electrical current i(t) is reached at the instant $T_7$ and is maintained from the instant $T_7$ to the instant $T_8$.

At the instant $T_8$, a positive electrical voltage v(t) is applied to circulate through the electromagnets 11 and 12 an electrical current i(t) that rapidly increases from the zero value to the peak effective value $I_1$ that is reached from the instant $T_9$ and is maintained until the instant $T_{10}$ by cycling the electrical voltage v(t) applied to the electromagnets 11 and 12.

At the instant $T_{10}$, the electrical current i(t) through the electromagnets 11 and 12 is decreased until, at the instant $T_{11}$, the holding effective value $I_3$ is reached by applying to the electromagnets 11 and 12 a zero or negative electrical voltage v(t); the holding effective value $I_3$ is maintained up to the instant $T_{12}$ by cycling the electrical voltage v(t) applied to the electromagnets 11 and 12.

At the instant $T_{12}$, the electrical current i(t) is gradually zeroed by applying to the electromagnets 11 and 12 a zero or negative electrical voltage v(t); in particular, the zero electrical current i(t) is reached at the instant $T_{13}$.

The zeroing of the electrical current i(t) at the instant $T_7$ causes the plunger 8 to move from the open position to the closed position under the elastic force generated by the spring 10 (which remains the only force acting on the plunger 8); when the plunger 8 is close to (near) the closed position, the reactivation of the electromagnets 11 and 12 between the instants $T_8$ and $T_{13}$ generates a force that slows down (but does not stop) the movement of the plunger 8 toward the closed position, so that the plunger 8 reaches the closed position with a relatively modest speed (kinetic energy) (therefore with a less violent impact when the closed position is reached).

Preferably, the pattern of the electrical voltage v(t) and the electrical current i(t) for opening the injection valve 7 and for slowing down the plunger 8 are similar in terms of simplicity of implementation (i.e., the control unit 19 needs only store a single control profile) and provide the same effective values $I_1$, $I_2$ and $I_3$ that are maintained for different time intervals (obviously in the initial phase more energy needs to be supplied to the plunger 8, whereas less energy is needed to slow down the plunger 8 just before the closing, and the effective values $I_2$ and $I_3$ may not even be reached).

In other words, the control unit 19 is configured, when the plunger 8 moves from the open position to the closed position, to circulate through the electromagnets 11 and 12 an electric current i(t) having initially a peak effective value $I_1$ and subsequently a holding effective value $I_3$ lower than the peak effective value $I_1$.

Therefore, the control unit 19 is configured to circulate through the electromagnets 11 and 12 an electrical current i(t) having an effective opening value to achieve a displacement of the plunger 8 from the closed position to the open position, to circulate through the electromagnets 11 and 12 an electrical current i(t) having an effective closing value (preferably, but not necessarily zero) to achieve a displacement of the plunger 8 from the open position to the closed position, and to circulate through the electromagnets 11 and 12 an electrical current i(t) having an effective slowing down value greater than the effective closing value to slow down the displacement of the plunger 8 from the open position to the closed position, without stopping it. Preferably, the effective slowing down value is equal to the effective opening value; furthermore, the effective slowing down value is circulated for a shorter time interval than a time interval for which the effective opening value is circulated.

In other words, the control unit 19 activates, when the plunger 8 moves from the open position to the closed position, the electromagnets 11 and 12, so that the electromagnets 11 and 12 generate a magnetic force that slows down the movement of the plunger 8 towards the closed position, without stopping it. Preferably, the electromagnets 11 and 12 are deactivated before the movable armature 19 reaches the closed position. Moreover, when the plunger 8 moves from the open position to the closed position, an electric current i(t) having initially a peak effective value $I_1$ and subsequently a holding effective value $I_3$ lower than the peak effective value $I_1$ (according to different embodiments, passing or not passing through the effective value $I_2$) is circulated through the electromagnets 11 and 12.

Figure 4:
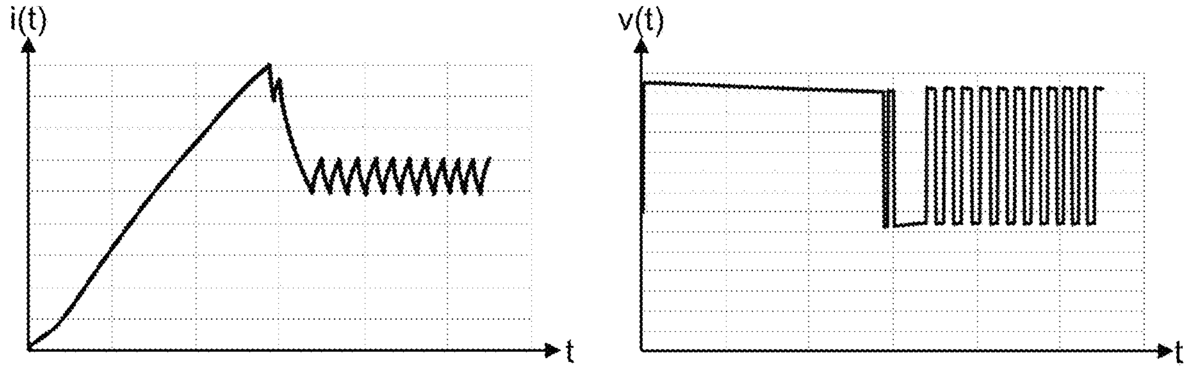
FIGS. 4, 5 and 6 illustrate a time course of an electrical current passing through the electromagnetic actuator and of an electrical voltage applied to the electromagnetic actuator according to three respective embodiments.
Figure 5:
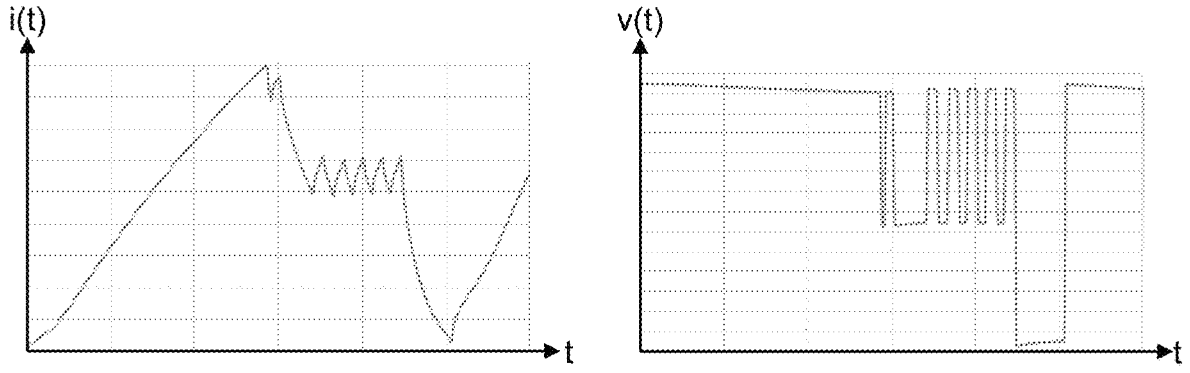
Figure 6:
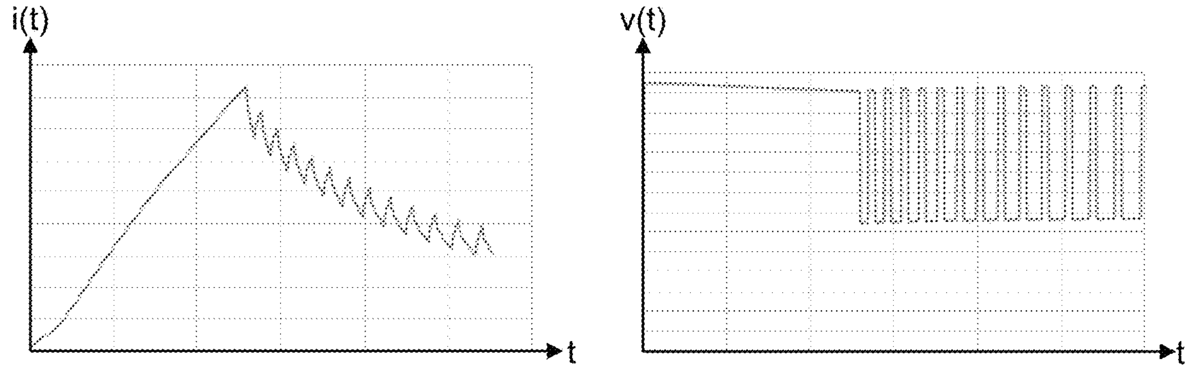

FIGS. 4, 5 and 6 show three different possible patterns of the electric voltage v(t) applied to the electromagnets 11 and 12, and three corresponding patterns of the electric current i(t) circulating through the electromagnets 11 and 12.

According to a preferred embodiment, the electromagnets 11 and 12 are controlled in an open loop mode by circulating predetermined electric current i(t) patterns (profiles) in the respective coils 13 and 17; self-calibration logics may be provided, which estimate the actual opening and/or closing instants of the injection valve 7, and based on the actual opening and/or closing instants of the injection valve 7 can make (if necessary) corrections to the predetermined electric current patterns (profiles).

According to a preferred embodiment, the two coils 13 and 16 are different from each other in that they must generate magnetic forces of different intensities and under different conditions; therefore, the two coils 13 and 17 generally differ from each other in terms of number of turns and therefore in shape and/or size. Similarly, the movable armatures 16 and 18 are also different from each other in that they must generate magnetic forces of different intensities and under different conditions; therefore, the two movable armatures 16 and 18 generally differ from each other in terms of shape and/or size.

In the embodiment shown in the attached figures, the electromagnetic actuator 6 comprises a single 1 main electromagnet 11 (provided with a main fixed armature 14 arranged inside the tubular body 4 and coupled to its main movable armature 16) and a single secondary electromagnet 12 (lacking a secondary fixed armature arranged inside the tubular body 4 and coupled to its secondary movable armature 18). According to other embodiments, not shown, the electromagnetic actuator 6 comprises a single main electromagnet 11 and two or more secondary electromagnets 12 (including up to four or five secondary electromagnets 12 or even more than five secondary electromagnets 12). According to further embodiments, not shown, the electromagnetic actuator 6 comprises two (or more) main electromagnets 11 and one, two, or more secondary electromagnets 12.

Where several secondary electromagnets 12 are provided, the various secondary electromagnets 12 can have different characteristics: for example, at least one secondary electromagnet 12 generates a magnetic force that is constantly positive (i.e., it constantly pushes the shutter 9 toward the open position of the injection valve 7), at least one secondary electromagnet 12 generates a magnetic force that is constantly negative (i.e., it constantly pushes the shutter 9 toward the closed position of the injection valve 7), at least one secondary electromagnet 12 generates a magnetic force that is initially positive and then negative, and/or at least one secondary electromagnet 12 generates a magnetic force that is initially negative and then positive.

In the preferred embodiment described above, the electromagnetic injector 1 is configured to inject hydrogen, but alternatively the electromagnetic injector 1 could be configured to inject any other type of gaseous fuel such as, for example, methane, or it could be also configured to inject a liquid fuel or water (generally when a high injection flow rate is required that needs particularly long strokes of the plunger 8).

The embodiments described herein may be combined with each other without departing from the scope of protection of the present invention.

The electromagnetic fuel injector 1 described above has many advantages.

Firstly, the electromagnetic fuel injector 1 described above has low noise and modest degradation (wear) due to the fact that the dynamics of the movable unit (i.e., the plunger 8 carrying the shutter 9 and the movable armatures 16 and 18) can be controlled with sufficient accuracy. Among other things, this also reduces rebound phenomena which introduce a certain amount of randomness in the amount of fuel being injected.

This is achieved by the presence of the secondary electromagnet 12 (or rather, of at least one secondary electromagnet 12) since while the magnetic force generated by the main electromagnet 11 is highly non-linear especially at the end of the opening (due to the approach of the main movable armature 16 to the main fixed armature 14, thus gradually zeroing the air gap), the magnetic force generated by the secondary electromagnet 12 is much more linear (the absence of a secondary fixed armature, i.e. a secondary bottom member, prevents introducing a "discontinuity" in the magnetic circuit) and therefore the overall magnetic force acting on the plunger 8 (given by the sum of the magnetic forces generated by the two electromagnets 11 and 12) is quite linear (or rather, much more linear than in a situation lacking the secondary electromagnet 12), thus making the dynamics of the movable unit controllable in a sufficiently accurate way.

In addition, the electromagnetic fuel injector 1 described above is simple and inexpensive to manufacture as it has few easy-to-build design differences compared to a similar known electromagnetic injector.

LIST OF REFERENCE NUMBERS IN THE FIGS

1 fuel injector
2 longitudinal axis
3 injection nozzle
4 support body
5 supply channel
6 electromagnetic actuator
7 injection valve
8 plunger
9 shutter
10 closing spring
11 electromagnet
12 electromagnet
13 main coil
14 main fixed armature
15 central hole
16 main movable armature
17 secondary coil
18 secondary movable armature
19 control unit
i(t) electric current
v(t) electric voltage
T instant of time

The invention claimed is:

1. An electromagnetic fuel injector comprising:

a tubular support body;

an injection nozzle arranged at one end of the support body;

an injection valve coupled to the injection nozzle;

a plunger, which is movable, so as to adjust a fuel flow through the injection nozzle, between a closed position and an open position of the injection valve;

an electromagnetic actuator provided with a main electromagnet, which is configured, when it is activated, to apply a force to the plunger, which pushes the plunger towards the open position of the injection valve, and with a secondary electromagnet; and a closing spring configured to push the plunger towards the closed position of the injection valve;

wherein the main electromagnet comprises a main fixed armature, which is integral to the support body and is arranged inside the support body, a main coil, which is arranged in the area of the main fixed armature, and a main movable armature, which is arranged inside the support body, is movable, is coupled to the main fixed armature so as to be magnetically attracted by the main fixed armature, is integral to the plunger and is magnetically coupled to the main coil;

wherein the secondary electromagnet comprises a secondary coil and a secondary movable armature, which is arranged inside the support body, is movable, is integral to the plunger and is magnetically coupled to the secondary coil;

wherein the secondary electromagnet lacks a secondary fixed armature, which is integral to the support body, is arranged inside the support body and is magnetically coupled to the secondary movable armature so as to magnetically attract the secondary movable armature.

2. The electromagnetic injector according to claim 1, wherein the secondary electromagnet is configured, when it is activated, to apply a force to the secondary movable armature, which pushes the plunger towards the open position of the injection valve along an entire stroke of the plunger from the closed position to the open position.

3. The electromagnetic injector according to claim 1, wherein the secondary electromagnet is configured, when it is activated, to apply to the secondary movable armature a first force, which pushes the plunger towards the open position of the injection valve along an initial part of a stroke of the plunger from the closed position to the open position, and a second force, which is contrary to the first force and pushes the plunger towards the closed position of the injection valve along a final part of the stroke of the plunger from the closed position to the open position.

4. The electromagnetic injector according to claim 1, wherein the secondary electromagnet is configured, when it is activated, to apply to the secondary movable armature a force, which pushes the plunger towards the closed position of the injection valve along an entire stroke of the plunger from the closed position to the open position.

5. The electromagnetic injector according to claim 4, wherein the secondary electromagnet is configured, when it is activated, to apply to the secondary movable armature a zero force when the plunger is in the closed position.

6. The electromagnetic injector according to claim 1, wherein the two coils of the two electromagnets are connected to one another in series and, hence, the same electric (i) current flows through them.

7. The electromagnetic injector according to claim 1, wherein the secondary electromagnet is configured to generate a magnetic force, which pushes the plunger due to the forces that attract the secondary movable armature towards a position of minimum magnetic reluctance relative to the secondary coil.

8. The electromagnetic injector according to claim 1, wherein a control unit is provided, which is configured to activate, when the plunger moves from the open position to the closed position, the electromagnets, so that the electromagnets generate a magnetic force that slows down the movement of the plunger towards the closed position, without stopping it.

9. The electromagnetic injector according to claim 8, wherein the control unit is configured to deactivate the electromagnets before the plunger reaches the closed position.

10. The electromagnetic injector according to claim 8, wherein the control unit is configured, when the plunger moves from the open position to the closed position, to circulate through the electromagnets an electric current (i) having initially a peak effective value ($I_1$) and subsequently a holding effective value ($I_3$) lower than the peak effective value ($I_1$).

11. The electromagnetic injector according to claim 1, wherein there is provided a control unit configured to:

circulate through the electromagnets an electric current (i) having an effective opening value to achieve a displacement of the plunger from the closed position toward the open position;

circulate through the electromagnets an electric current (i) having an effective closing value to achieve a displacement of the plunger from the open position toward the closed position; and circulate through the electromagnets an electric current (i) having an effective slowing down value greater than the effective closing value to slow down the displacement of the plunger from the open position toward the closed position, without stopping it.

12. The electromagnetic injector according to claim 11, wherein the effective slowing down value is equal to the effective opening value.

13. The electromagnetic injector according to claim 11, wherein the effective slowing down value is circulated for a shorter time interval than a time interval for which the effective opening value is circulated.

14. A control method for controlling the electromagnetic injector according to claim 1 and comprising the step of activating, when the plunger moves from the open position to the closed position, the electromagnets such that the electromagnets generate a magnetic force that slows down the travel of the plunger toward the closed position, without stopping it.

15. The control method according to claim 14, wherein the electromagnets are deactivated before the movable armature plunger reaches the closed position.

16. The control method according to claim 14, wherein, when the plunger moves from the open position to the closed position, an electric current (i) having initially a peak effective value ($I_1$) and subsequently a holding effective value ($I_3$) lower than the peak effective value ($I_1$) is circulated through the electromagnets.

* * * * *